United States Patent [19]

Ewald et al.

[11] 4,272,573
[45] Jun. 9, 1981

[54] SELF-ADHESIVE TAPE

[75] Inventors: Richard Ewald, Weinheim; Klaus Freiberg, Mannheim, both of Fed. Rep. of Germany

[73] Assignee: Braas & Co. GmbH, Frankfurt am Main, Fed. Rep. of Germany

[21] Appl. No.: 41,180

[22] Filed: May 21, 1979

[30] Foreign Application Priority Data

May 19, 1978 [DE] Fed. Rep. of Germany ....... 2821859

[51] Int. Cl.³ .......................... C09J 7/00; C08K 5/09; C08K 5/06; C08K 5/02
[52] U.S. Cl. ....................................... 428/40; 428/355; 156/330; 156/331.6; 156/333; 156/306.6; 525/108; 260/31.8 M
[58] Field of Search ............... 156/333, 331, 330, 332; 525/108; 260/31.8 M; 428/40, 355

[56] References Cited

U.S. PATENT DOCUMENTS 2,728,703  12/1975  Kiernan et al. ....................... 156/333
4,170,612  10/1979  Pastor et al. ...................... 156/331 X

FOREIGN PATENT DOCUMENTS 1264020 of 1968 Fed. Rep. of Germany .
137975 of 1961 U.S.S.R. ................................... 525/108

OTHER PUBLICATIONS

Pages 355 and 356, vol. 14, of "Encyl. of Polymer Science and Tech.".

Primary Examiner—Marion McCamish
Assistant Examiner—Alexander S. Thomas
Attorney, Agent, or Firm—Young & Thompson

[57] ABSTRACT

A self-adhesive tape particularly suitable for use in the building industry for joining and sealing PVC sheets, comprising 100 parts by weight of a vinyl chloride/-vinylisobutylether copolymer, from 100 to 400 parts by weight of a mixture of nitrile rubber and a polyvinylchloride homopolymer, from 60 to 230 parts by weight of a plasticizer consisting of one or more esters of phthalic acid, and from 4 to 70 parts by weight of a resinous plasticizer which is an aromatic polyether, an epoxy resin or a mixture thereof, and which imparts adhesive properties to the composition.

12 Claims, 1 Drawing Figure

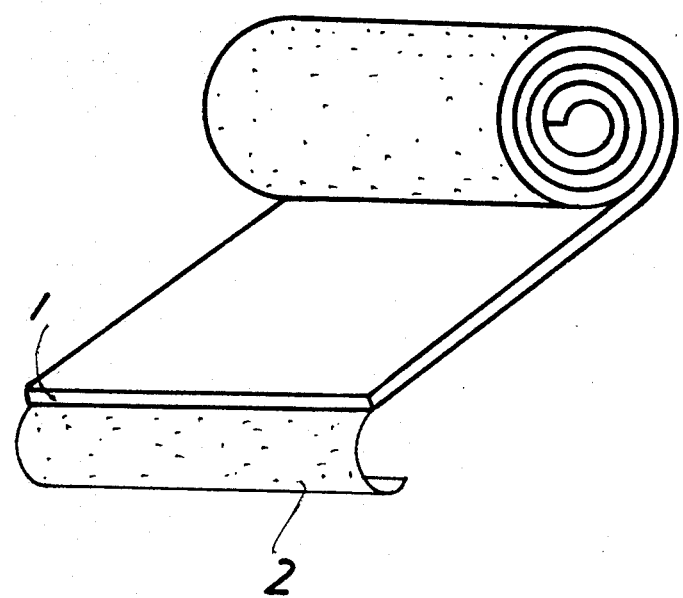

SELF-ADHESIVE TAPE

This invention relates to a self-adhesive tape for joining or sealing webs of PVC, such as are used in the building industry.

Self-adhesive tapes which include PVC are known, for example from German Patent Specification No. 1264020. The plasticisers used for the tapes described in this specification are of the slightly volatile or non-volatile type, and such self-adhesive tapes have unsatisfactory adhesion to the sorts of PVC normally used in the building industry. The invention provides a self-adhesive tape comprising 100 parts by weight of a vinyl chloride/vinylisobutylether copolymer from 100 to 400 parts by weight of a mixture of nitrile rubber and a polyvinylchloride homopolymer, from 60 to 230 parts by weight of a plasticiser consisting of one or more esters of phthalic acid, and from 4 to 70 parts by weight of a resinous plasticiser which is an aromatic polyether, an epoxy resin or a mixture thereof, and which imparts adhesive properties to the composition.

Included within the scope of the invention is a tape, having a removable backing sheet, for example of polyethylene. In the composition of the invention, the adhesiveness of the tape is produced not by the presence of low-molecular weight polymers, but by the combined use of plasticisers of the resinous type (aromatic polyethers) and/or epoxy resins) and a copolymer of vinylchloride and vinylisobutylether.

The thermal stability under load necessary for use in the building industry is provided by the nitrile rubber.

The plasticiser concentration in the compositions of the invention is preferably of the same order as the plasticiser concentrations in the types of polyvinylchloride webs normally used in the building industry, in order to reduce aging effects caused by plasticiser migrations. When the resinous plasticiser is the epoxy resin alone, it is preferably used in an amount of from 4 to 15 parts by weight, per 100 parts by weight of the copolymer.

The compositions of the invention may preferably be prepared by kneading the ingredients together vigorously and extruding the kneaded mixture.

The ratio of nitrile to PVC homopolymer in the mixture is preferably approximately 70:30 by weight.

The copolymer preferably contains about 25% by weight of vinylisobutylether units.

The composition preferably contains about 100 parts by weight of the nitrile rubber, and about 45 parts by weight of the polyvinylchloride homopolymer, per 100 parts by weight of the copolymer. The phthalic acid ester type plasticiser is preferably dioctyl phthalate, and is preferably present in an amount of approximately 45 parts by weight per 100 parts by weight of the total of the copolymer, the nitrile rubber, and the PVC homopolymer.

A PVC stabiliser, for example cadmium or barium stearate is preferably included, in an amount of from 1 to 2 parts by weight, per 100 parts by weight total copolymer, nitrile rubber, and PVC homopolymer.

The composition may also comprise one or more mineral fillers or pigments, in an amount not exceeding 50 parts by weight, per 100 parts by weight of the total copolymer, nitrile rubber, and PVC homopolymer.

Self-adhesive tapes produced according to the invention have particular application in the building industry, for example for roof-sealing, where weathering and temperatures as high as 80° C. have to be taken into consideration.

The following figure illustrates the preparation of a tape in accordance with the present invention.

EXAMPLE 60 parts by weight of a commercially available mixture consisting of 70% by weight of a powdered nitrile rubber (having a particle size not greater than 0.5 mm and an acrylonitrile content of about 30%) and 30% by weight of a vinylchloride homopolymer (trade name Perbunan N/VC 70), 40 parts by weight of a polyvinylchloride copolymer containing about 25% by weight vinylisobutylether units (trade name LAROFLEX MP 45), 45 parts by weight of dioctyl phthalate (trade name PALATINOL AH) 3 parts by weight of an epoxy resin (trade name EPIKOTE 834), 2 parts by weight of a barium-cadmium stearate stabilizer (trade name BÄROSTAB BCR29A), and 10 parts by weight of chalk (trade name OMYA bsh), were kneaded intensively and heated to a temperature of approximately 130° C., and then extruded as a tape 1 mm thick and 40 mm wide. For convenient storage, the tape was rolled up as produced as shown in the drawing, with a sheet of polyethylene 2 separating adjacent layers 1.

The adhesion of the tape to soft PVC webs having a plasticiser content of about 35% by weight was investigated, and it was found that application by pressing resulted in satisfactory adhesion, without prior, treatment of the PVC web. The peel strength (measured at an angle of about 180°) was measured at periods of 1, 7, 30 and 90 days after application, and the results are shown in the Table below. As can be seen from the figures in the Table, the adhesion strength increased over this period.

TABLE

| Peel-resistance in N/cm at a temperature of 23° C. | | | |
| --- | --- | --- | --- |
| 1 day after application | 7 days after application | 30 days after application | 90 days after application |
| 10 | 11 | 14 | 22 |

We claim:

1. A self-adhesive tape comprising 100 parts by weight of a vinyl chloride/vinylisobutylether copolymer from 100 to 400 parts by weight of a mixture of nitrile rubber and a polyvinylchloride homopolymer, from 60 to 230 parts by weight of a plasticiser consisting of one or more esters of phthalic acid, and from 4 to 70 parts by weight of a resinous plasticiser which is an epoxy resin and which imparts adhesive properties to the composition.

2. A tape as claimed in claim 1, wherein the copolymer contains about 25% by weight of units of vinylisobutylether.

3. A tape as claimed in claim 1, or claim 2, wherein the amount of nitrile rubber is about 100 parts by weight.

4. A tape as claimed in claim 1, wherein the amount of polyvinylchloride homopolymer is about 45 parts by weight.

5. A tape as claimed in claim 1 wherein the ratio of nitrile rubber to polyvinylchloride hompolymer is approximately 70:30 by weight.

6. A tape as claimed in claim 1, wherein the resinous plasticiser is present in an amount of from 4 to 15 parts by weight.

7. A tape as claimed in claim 1, wherein the phthalic acid ester plasticiser is dioctyl phthalate.

8. A tape as claimed in claim 7, wherein the amount of dioctyl phthalate is approximately 45 parts by weight per 100 parts by weight of the total of the copolymer, the nitrile rubber, and the polyvinylchloride homopolymer.

9. A tape as claimed in claim 1, which includes a polyvinylchloride stabiliser in an amount of from 1 to 2 parts by weight per 100 parts by weight of the total of the copolymer, the nitrile rubber, and the polyvinylchloride homopolymer.

10. A tape as claimed in claim 1, which also contains one or more mineral fillers or pigments in an amount not exceeding 50 parts by weight per 100 parts by weight of the total of the copolymer, the nitrile rubber, and the polyvinylchloride homopolymer.

11. A self-adhesive tape, comprising 100 parts by weight of a vinyl chloride/vinylisobutylether copolymer containing about 25% by weight of vinylisobutylether units, about 150 parts by weight of a mixture of a nitrile rubber and a polyvinylchloride homopolymer in which the ratio of nitrile rubber to polyvinylchloride homopolymer is about 70:30 by weight, about 112 parts by weight of a plasticiser which is an ester of phthalic acid, and about 7.5 parts by weight of a resinous plasticizer which is an epoxy resin.

12. A tape as claimed in claim 1 or claim 11, having a removable backing sheet.

* * * * *